Oct. 13, 1931.  W. F. STIMPSON ET AL  1,827,048
SCALE
Filed Dec. 12, 1927   4 Sheets-Sheet 3
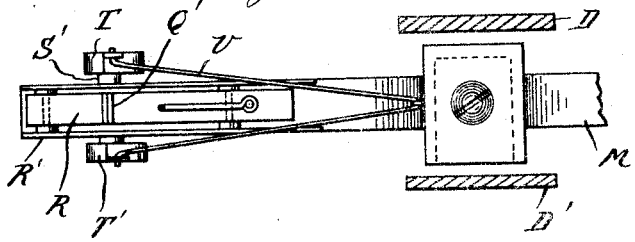
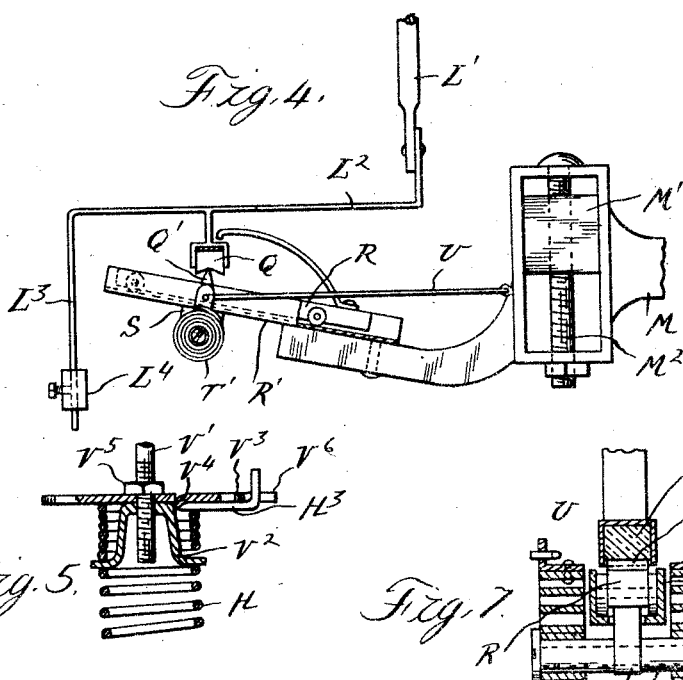
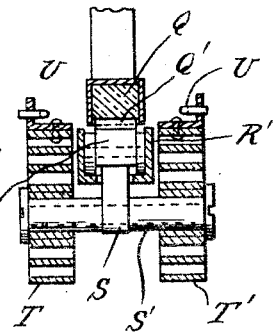
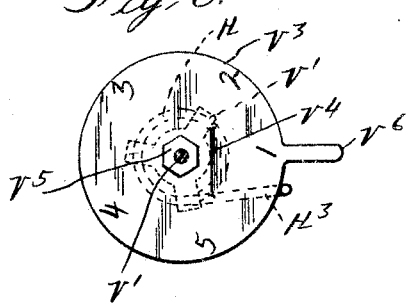
Inventors
Walter F. Stimpson
Willis E. Finch
By Whittemore Hulbert
Whittemore & Belknap
Attorneys

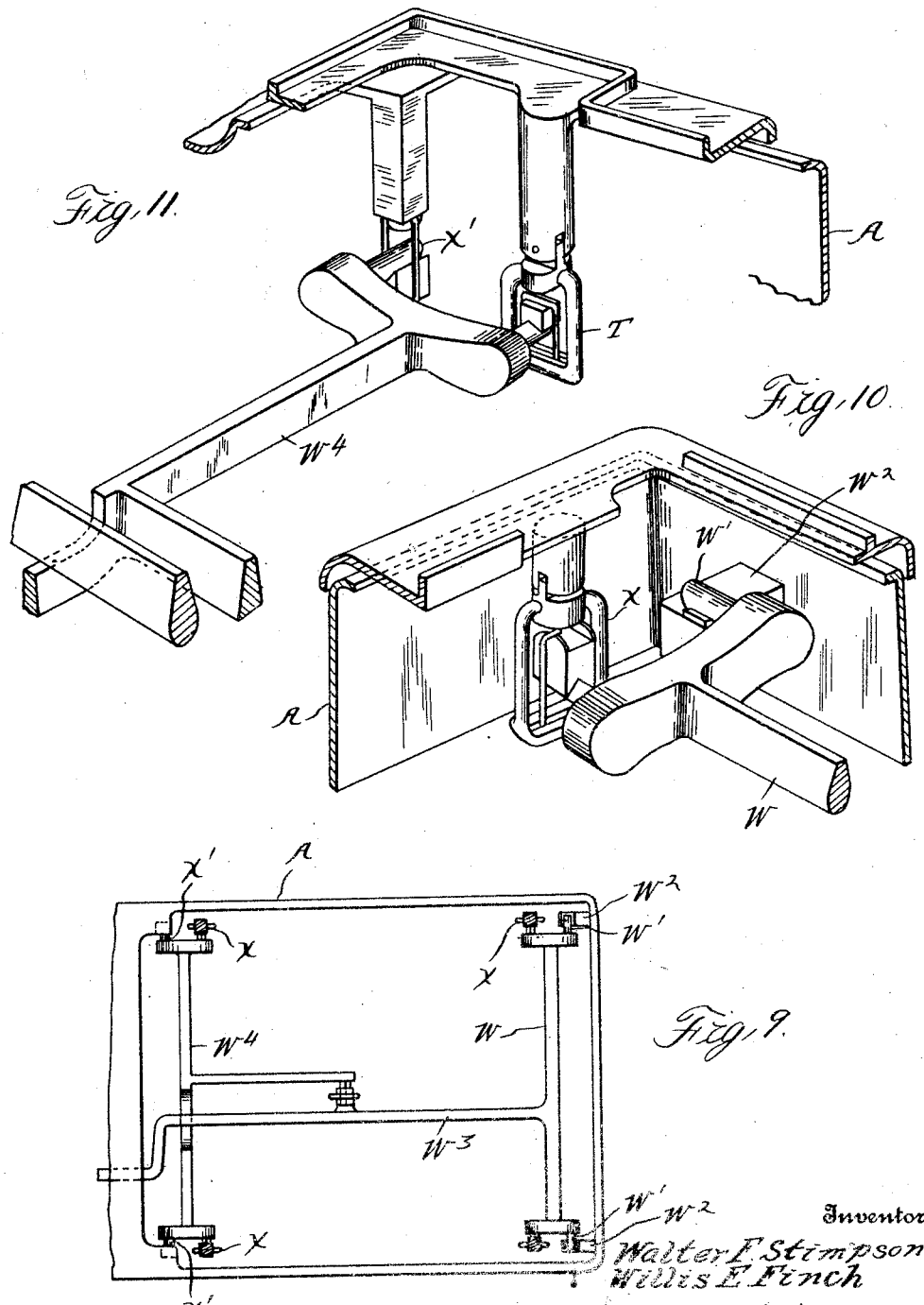

Patented Oct. 13, 1931

1,827,048

UNITED STATES PATENT OFFICE

WALTER F. STIMPSON AND WILLIS E. FINCH, OF LOUISVILLE, KENTUCKY; SAID FINCH ASSIGNOR TO SAID STIMPSON

SCALE

Application filed December 12, 1927. Serial No. 239,588.

The invention relates to spring balance scales and has more particular reference to the type of construction provided with opposed springs for automatic temperature compensation. In the present state of the art various attempts have been made to effect automatic temperature compensation by the use of opposed springs. It has been found, however, that while such constructions compensate to a considerable degree, they do not effect complete compensation, so that the operation of the scale under different temperatures is not quite accurate.

It is the object of the present invention to obtain a construction in which there is accurate compensation for all variations in temperature and further to obtain certain other advantages as hereinafter set forth.

In the drawings;

Figure 3 is a plan view of the thermostatic adjustment means.

Figure 4 is a front elevation thereof.

Figure 5 is a section showing the means for adjusting spring tension.

Figure 6 is a plan view thereof.

Figure 7 is a cross section through the thermostat.

Figure 9 is at diagrammatic plan view of the platform levers.

Figure 10 is a perspective view of a portion of the frame and main platform lever showing the manner of fulcruming the latter.

Figure 11 is a similar view showing the companion lever and the manner in which it is fulcrumed.

Figure 1:
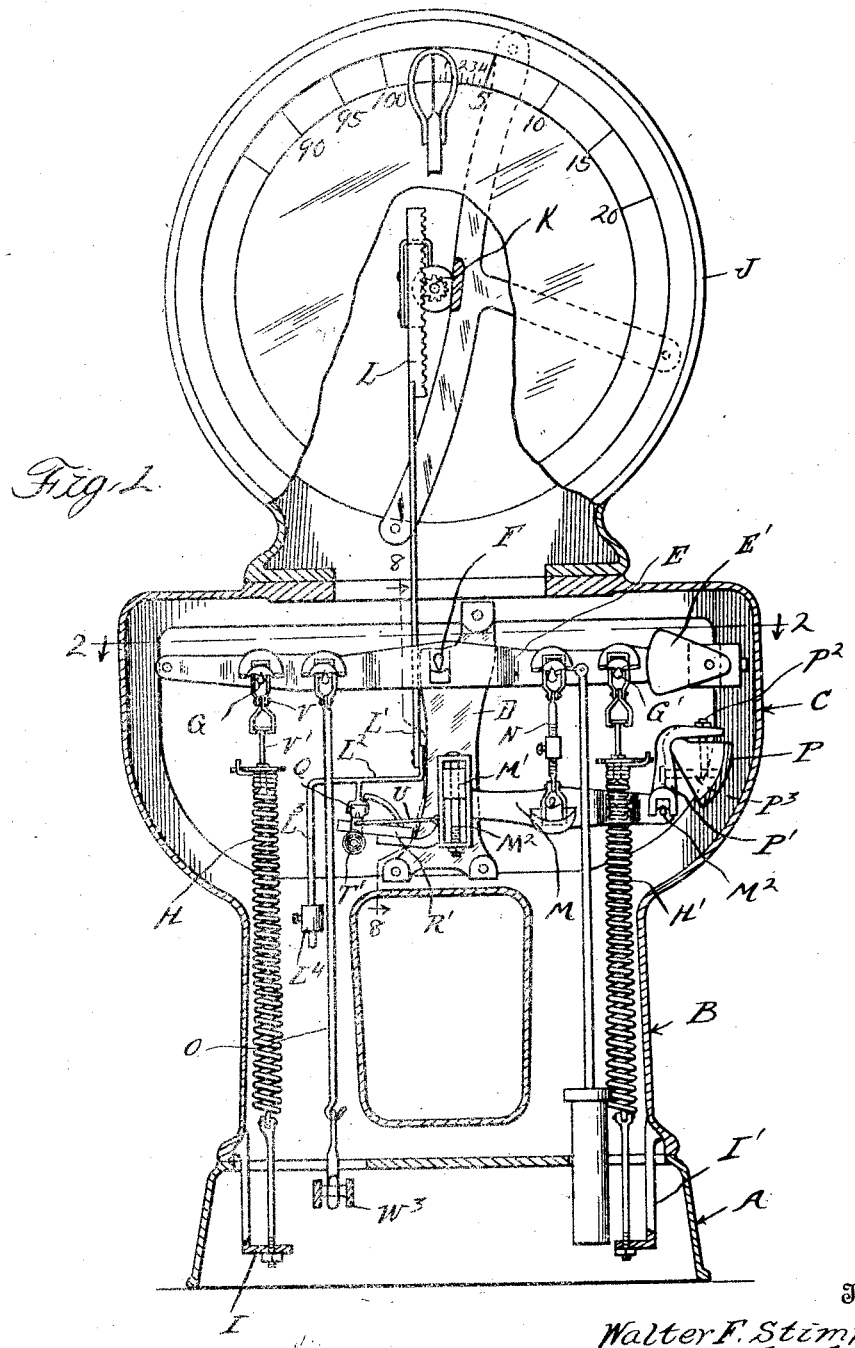
Figure 1 is a vertical section through the pedestal of the scale showing the weighing mechanism and indicator in elevation.
Figure 2:
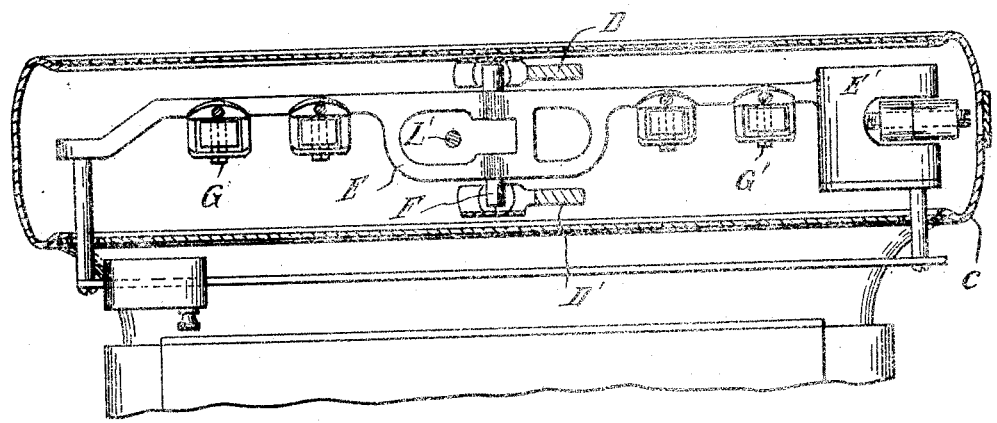
Figure 2 is a horizontal section taken substantially on line 2—2 of Figure 1.
Figure 8:
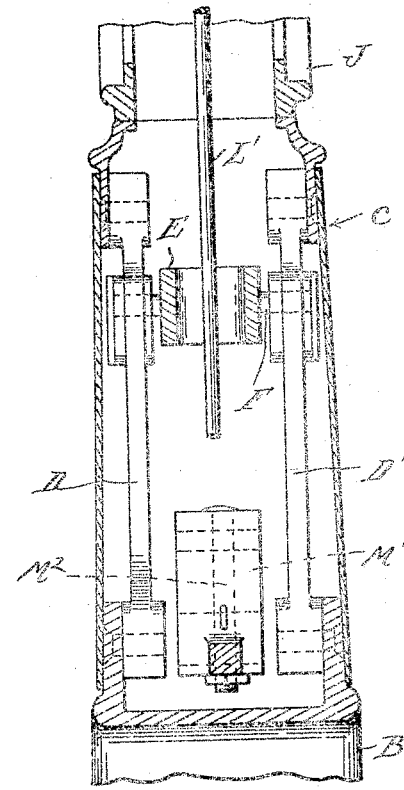
Figure 8 is a cross section on line 8—8 of Figure 1.

Our improvements are applicable to various types of scales such as counter and portable platform scales, etc. As shown in Figure 1 A is the scale base containing the platform levers and B is the pedestal or frame rising from one end of said base and carrying the weighing mechanism. This pedestal B is provided at its upper end with a laterally enlarged portion C for receiving the weighing levers and cut away front and rear to expose these levers to view. Arranged centrally within the portion C are the vertically extending bracket members D and D' which form fulcrum bearings for the lever E. This lever has the central fulcrum pivot F and approximately equally spaced upon opposite sides thereof the knife edged pivots G, G' for attachment of the weighing springs H, H'. The latter extend downward within the hollow pedestal and are anchored at their lower ends to bearings I, I'. Mounted on top of the portion C is the indicator J which is operated by a pinion K and rack L. Instead, however, of connecting the rack bar L directly to the lever E it is actuated through the medium of a second lever M arranged below the lever E and connected thereto by the link N. The lever E is also connected to the platform levers through a steelyard rod O.

As the springs H and H' are of approximately equal tension and are connected to the lever E at points approximately equally spaced on opposite sides of the fulcrum F, it is obvious that the reaction of said springs on the lever tends to hold the same in horizontal or one-half capacity position. To normally hold the lever and indicator mechanism in zero position and to offset the weight of platform and levers, it is necessary to introduce a gravity load. This, as shown, comprises a weight E' on the lever E to the right of the fulcrum F and the weight M' on the lever N to the left of its fulcrum pivot $M^2$. The arrangement is such that any tilting of the scale from the level will not affect gravity loading as the sum of the reactions of the two weights E' and M' will remain constant in each position.

To facilitate adjustment for sealing the fulcrum for the lever M which is a lever of the third class, is adjustably mounted on a bracket P secured to one side of the frame C. The fulcrum member P' is of angular form with the angle thereof pivotally engaging the nose of the member P. Vertically and horizontally adjusting screws $P^2$, $P^3$ secure the member P' to the member P and permit of rocking the same to different positions of adjustment. This will displace the lever M longitudinally with respect to the lever E which permits of arranging the link N connecting these levers in approximately vertical position at one half capacity position. The weight M' on the lever M is also adjustable vertically by means of the adjusting screw M², for the purpose of raising or lowering the center of gravity.

As has been stated the opposed springs H and H' while compensating for temperature changes to a considerable extent will not entirely do so. We have, therefore, introduced a further compensating feature which is arranged between the lever M and its connection to the rack bar L. As shown in Figures 3 and 4 the rack L is connected by a rod L' and a lateral extension L² thereof to the V-shaped bearing Q for engaging the knife edged pivot Q'. The latter is mounted on the roller carriage R which engages a channel extension R' of the lever M. S is a lug depending from the carriage R and passing through a slot in the channel member R'. S' is a horizontally extending pin secured to the lug S, and T and T' are spirally coiled thermostatic bars attached at their inner ends to the pin S' and at their outer ends anchored by rods U to the lever M. The arrangement is such that temperature changes by contracting or expanding the thermostatic spiral bars T, T' will cause the carriage R to move outwardly or inwardly in the channel R' thereby increasing or shortening the effective length of the lever M operating upon the rack bar L. The amount of adjustment required is very slight as it is only necessary to supplement and compensate the action of the opposed springs H and H'. The rack bar L is partially counter-balanced by the outwardly and downwardly extending arm L³ and weight L⁴ to reduce the lateral thrust of said rack bar against the pinion K.

For adjusting the tension of the springs H they are attached to the bearings engaging the pivots G, G' by the following construction;

V are the loop bearings for engaging the pivots G, G'. V' is a threaded rod depending from the loop bearing V and swivelled therein. V² is a pronged member threadedly engaging the rod V' and having the prongs thereof inserted between convolutions of the spring H. V³ is a disk member sleeved on the rod V' above the member V² and provided with a downward projection V⁴ forming a rotative engagement with said member. V⁵ is a lock nut engaging the threaded rod V'. H³ is the upper end of the helical spring H which projects radially outward and then upward at the periphery of the disk V³. V⁶ is a radially outwardly projecting finger on the disk. The arrangement is such that by turning the disk, the member V² will be adjusted so as to either lengthen or shorten the free portion of the spring H. The total amount of adjusting is only one convolution of the spring and the amount of angular adjustment is indicated on the disk by numerals or other characters placed thereon, the chief object being to prevent the excessive adjustment of one spring without similar adjustment of the other. Also, if necessary, the end portion H³ of the spring can be sprung outward and placed on the other side of the finger V⁶ permitting of another revolution of adjustment.

Where the scale frame is out of level the divided weights respectively on the levers E and M will compensate as has been previously described. If, however, the platform levers were free to oscillate laterally, this would swing the steelyard rod in relation to the lever E and would thus introduce another inaccuracy. We have guarded against this difficulty by so mounting the platform lever directly attached to the steelyard rod as to hold it from lateral swinging movement. Thus as shown this lever W has its fulcrum pivots W' engaging fixed bearings on the lugs W² projecting inward from the stationary frame A. The forwardly projecting arm W³ of this lever is attached to the steelyard O. Thus where the scale frame is tilted out of level neither the lever W nor the steelyard O is capable of swinging, to alter the relation of said steelyard to the lever E. The weighing platform is, however, supported on oscillatory looped bearings X and the companion platform lever W⁴ is fulcrumed upon swinging looped bearings X'. This will permit perfect freedom of movement of the platform whether the scale is in or out of level but, as before stated, without permitting any lateral displacement of the steelyard O.

What we claim as our invention is:

1. In a scale, the combination with a lever of opposed weighing springs connected to said lever for partially compensating for temperature changes and thermostatically operated means for supplementing the compensation.

2. In a scale, the combination with a lever of opposed weighing springs connected to said lever for partially compensating for temperature changes, gravity loading means for one of said springs arranged to compensate for changes in level and thermostatically operated means for supplementing the temperature compensation.

3. In a scale the combination with a weighing platform and indicator and intermediate mechanism including a lever, of opposed weighing springs reacting upon said lever and partially compensating for temperature changes, gravity loading means for one of said springs arranged to be unaffected by changes in level and thermostatically operated means for supplementing the temperature compensation of said opposed springs.

4. In a scale the combination of a pair of parallelly and vertically arranged springs, of a lever to which said springs are attached at points approximately equally spaced on opposite sides of the fulcrum thereof, a second lever operatively arranged below the first mentioned lever, weights on said levers acting in unison to load one of said springs and reacting equally thereupon, said weights being arranged respectively on opposite sides of their fulcrums, a steelyard rod connected to said first mentioned lever, an indicator and a connection between said second mentioned lever and said indicator.

5. In a scale, the combination with a pair of parallelly and vertically arranged springs, of a lever to which said springs are attached at points approximately equally spaced on opposite sides of the fulcrum thereof, a lever arranged below and parallel to said first mentioned lever, weights on said levers acting in unison to load one of said springs and reacting equally thereupon, said weights being arranged respectively on opposite sides of their fulcrums, a steelyard rod connecting said first mentioned lever, an indicator, a connection between said indicator and said second mentioned lever adjustable on the latter toward and from its fulcrum and a thermostat operating to adjust said connection and supplementing the temperature compensation of said opposed springs.

6. In a scale, the combination with a pair of parallelly and vertically arranged springs, of a lever to which said springs are attached at points approximately equally spaced on opposite sides of the fulcrum thereof, a lever arranged operatively below said first mentioned lever, weights on said levers acting in unison to load one of said springs and reacting equally thereupon, said weights being arranged respectively on opposite sides of their fulcrums, a steelyard rod connecting said first mentioned lever, an indicator, a roller carriage on said second mentioned lever movable toward and from the fulcrum thereof, a connection between said carriage and said indicator and a thermostat for adjusting said carriage on said lever supplementing the temperature compensation of said opposed springs.

7. In a scale the combination with a base, platform levers therein, a hollow pedestal rising from one end of said base, a lateral enlargement at the upper end of said pedestal, a lever centrally fulcrumed and extending oppositely into said lateral enlargement, springs attached to said lever at points approximately equally spaced on opposite sides of the fulcrum thereof and extending downward through said hollow pedestal, an anchorage for the lower end of each spring, a lever arranged below said first mentioned lever parallel thereto and fulcrumed at one end, a connection between said levers, weights on said levers acting in unison to load one of said springs and reacting equally thereupon, said weights being arranged respectively on opposite sides of their fulcrums, a steelyard rod connecting said first mentioned lever with the platform levers in the base, an indicator mounted on said pedestal and a connection between said indicator and said second mentioned lever.

8. In a scale a thermostatic adjustment comprising a lever, a channel extension thereof, a roller carriage in said channel extension, a lug depending from said roller carriage passing through a slot in said channel, a spiral thermostat having one end connected to said channel and the opposite end to said lug, a knife-edged pivot mounted on said carriage and a cooperating bearing for said knife-edged pivot.

9. In a scale, the combination of a pair of parallelly and vertically arranged springs, a lever to which said springs are attached at points approximately equally spaced on opposite sides of the fulcrum thereof, a lever arranged operatively below said first mentioned lever and connected thereto, weights on said levers acting in unison to load one of said springs and reacting equally thereupon, said weights being arranged respectively on opposite sides of their fulcrums, an indicator, a connection between said second mentioned lever and said indicator, a steelyard rod, connected to said first mentioned lever, a platform lever to which said steelyard rod is connected, a fulcrum bearing for said platform lever holding the same against lateral movement, a cooperating platform lever, a platform supported thereon and bearings for said platform and for said second platform lever permitting lateral movement thereof.

10. In a spring scale, adjustment means for spring tension comprising a threaded shank, a pronged member engaging the convolutions of said spring and threaded to engage said shank, a disk sleeved on said shank adjacent to said pronged member and rotatably coupled therewith, a finger projecting from said disk, a projection from the end convolution of said spring bent to engage said finger, and a lock nut on said shank for holding said disk and pronged member from movement.

11. In a scale, the combination with a lever, of weighing springs connected to said lever for partially compensating for temperature changes, a second lever operatively arranged below and connected to the first mentioned lever, an indicator and a connection between said second lever and said indicator including auxiliary compensating means.

12. In a scale, the combination with a lever, of weighing springs connected to said lever for partially compensating for temperature changes, a second lever operatively arranged below and connected to the first mentioned lever, an indicator, a connection between said second lever and said indicator including auxiliary compensating means, and gravity loading means for said first mentioned lever to bring the indicator to the zero point.

13. In a scale, the combination of a pair of parallelly and vertically arranged springs, of a lever to which said springs are attached at points approximately equally spaced on opposite sides of the fulcrum thereof for partially compensating for temperature changes, a second lever operatively arranged below and connected to the first mentioned lever, a steelyard rod connected to said first mentioned lever, an indicator and a connection between said second lever and said indicator including auxiliary compensating means.

14. In a scale, the combination of a pair of parallelly and vertically arranged springs, of a lever to which said springs are attached at points approximately equally spaced on opposite sides of the fulcrum thereof for partially compensating for temperature changes, a second lever operatively arranged below and connected to the first mentioned lever, a steelyard rod connected to said first mentioned lever, an indicator, a connection between said second lever and said indicator including auxiliary compensating means and a gravity loading means for said first mentioned lever to normally hold the lever and indicator mechanism in zero position.

In testimony whereof we affix our signatures.

WALTER F. STIMPSON.
WILLIS E. FINCH.